United States Patent
Ihara et al.

(10) Patent No.: US 10,232,538 B2
(45) Date of Patent: Mar. 19, 2019

(54) BOND MAGNET AND METHOD FOR MANUFACTURING THE SAME

(71) Applicant: NICHIA CORPORATION, Anan-shi (JP)

(72) Inventors: Kohei Ihara, Tokushima (JP); Michiya Kume, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 450 days.

(21) Appl. No.: 15/131,029

(22) Filed: Apr. 18, 2016

(65) Prior Publication Data

US 2016/0303788 A1 Oct. 20, 2016

(30) Foreign Application Priority Data

Apr. 20, 2015 (JP) ................. 2015-085889

(51) Int. Cl.

| | |
|---|---|
| *H01F 1/057* | (2006.01) |
| *B29C 47/00* | (2006.01) |
| *H01F 41/02* | (2006.01) |
| *H01F 1/113* | (2006.01) |
| *B29B 7/42* | (2006.01) |
| *B29C 47/40* | (2006.01) |
| *B29C 47/92* | (2006.01) |

(52) U.S. Cl.
CPC ..... *B29C 47/0076* (2013.01); *H01F 41/0266* (2013.01); *B29B 7/42* (2013.01); *B29C 47/0004* (2013.01); *B29C 47/0021* (2013.01); *B29C 47/0066* (2013.01); *B29C 47/40* (2013.01); *B29C 47/92* (2013.01); *H01F 1/0578* (2013.01); *H01F 1/113* (2013.01)

(58) Field of Classification Search
CPC ............................. H01F 1/047; H01F 7/0215
See application file for complete search history.

(56) References Cited

U.S. PATENT DOCUMENTS 5,682,670 A    11/1997    Bell et al.

FOREIGN PATENT DOCUMENTS

| | | |
|---|---|---|
| JP | 05-003115 | 1/1993 |
| JP | 07-509348 | 10/1995 |
| JP | 2005-050988 | 2/2005 |
| JP | 2006-329749 | 12/2006 |
| JP | 2013-105964 | 5/2013 |

OTHER PUBLICATIONS

Japanese Office Action for corresponding JP Application No. 2015-085889, dated Mar. 27, 2018 (w/ machine translation).

*Primary Examiner* — Jessee R Roe
(74) *Attorney, Agent, or Firm* — Mori & Ward, LLP

(57) ABSTRACT

A method for manufacturing a bond magnet includes providing a bond magnet composition including a magnetic material and a resin, extruding the bond magnet composition in one direction to produce a molded body while orienting the magnetic material in the one direction, magnetizing the molded body in the one direction using an axial magnetization to produce a magnetized molded body, and laminating the magnetized molded body to produce a laminated molded body including first magnetized molded layers and second magnetized molded layers. The first magnetized molded layers and the second magnetized molded layers are alternately laminated. A first magnetization direction of each of the first magnetized molded layers is opposite to a second magnetization direction of each of the second magnetized molded layers.

11 Claims, 3 Drawing Sheets

BOND MAGNET AND METHOD FOR MANUFACTURING THE SAME

CROSS-REFERENCE TO RELATED APPLICATIONS

The present application claims priority under 35 U.S.C. § 119 to Japanese Patent Application No. 2015-085889, filed Apr. 20, 2015. The contents of this application are incorporated herein by reference in their entirety.

BACKGROUND

Technical Field

The present disclosure relates to a bond magnet and a method for manufacturing a bond magnet.

Discussion of the Background

Japanese Unexamined Patent Application Publication No. 5-3115 and Japanese Patent No. 3152659 describe a method in which a magnet is divided into small pieces to be subjected to saturated magnetization by a magnetizing apparatus and then are arranged to be formed into a multipolar magnet.

SUMMARY OF THE INVENTION

According to one aspect of the present invention, a method for manufacturing a bond magnet includes providing a bond magnet composition including a magnetic material and a resin, extruding the bond magnet composition in one direction to produce a molded body while orienting the magnetic material in the one direction, magnetizing the molded body in the one direction using an axial magnetization to produce a magnetized molded body, and laminating the magnetized molded body to produce a laminated molded body including first magnetized molded layers and second magnetized molded layers. The first magnetized molded layers and the second magnetized molded layers are alternately laminated. A first magnetization direction of each of the first magnetized molded layers is opposite to a second magnetization direction of each of the second magnetized molded layers.

According to another aspect of the present invention, a bond magnet includes a plurality of magnet pieces which is magnetized by axial magnetization and which is laminated such that N-poles and S-poles of the plurality of magnet pieces are alternately arranged. The plurality of magnet pieces include an anisotropic Sm—Fe—N-based magnetic material and a resin. A distance λ between an N-pole among the N-poles and an S-pole adjacent to the N-pole among the S-poles is equal to or more than 0.1 mm and equal to or less than 1.0 mm.

According to further aspect of the present invention, a method for manufacturing a bond magnet includes providing a bond magnet composition including a magnetic material and a resin, extruding the bond magnet composition in one direction to produce a molded body, orienting the magnetic material in the one direction, magnetizing the molded body in the one direction using an axial magnetization to produce a magnetized molded body, and laminating the magnetized molded body to produce a laminated molded body including a first magnetized molded layer and a second magnetized molded layer adjacent to the first magnetized molded layer such that a first magnetization direction of the first magnetized molded layer is opposite to a second magnetization direction of the second magnetized molded layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
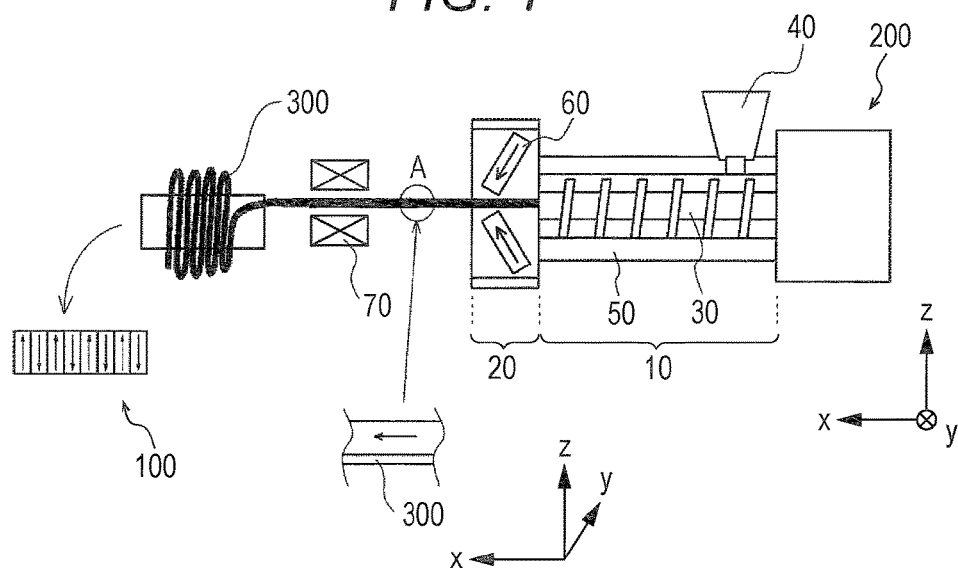
FIG. 1 is a schematic view illustrating a method for manufacturing a bond magnet according to an embodiment.

The embodiments will now be described with reference to the accompanying drawings, wherein like reference numerals designate corresponding or identical elements throughout the various drawings.

Hereinafter, embodiments will be described appropriately with reference to drawings. However, the following methods for manufacturing bond magnets and the bond magnets are described to embody the technological thought of the present disclosure and thus unless specific description is made, the present disclosure is not limited to the following. Further, what is described in an embodiment and an example is also applicable to other embodiments and examples.

The size or positional relationship of members illustrated in each drawing may be exaggerated in order to make the description clear. The direction "x" is also called the "lateral" direction, the direction "y" is also called the "longitudinal" direction, and the direction "z" is also called the "vertical" direction or the "height (thickness)" direction.

FIG. 1 is a schematic view illustrating a method for manufacturing a bond magnet according to an embodiment. The method for manufacturing the bond magnet according to an embodiment includes (1) a preparation process to prepare a bond magnet composition including a magnetic material and a resin, (2) a extruding process the bond magnet composition in one direction by the extrusion molding while orienting the magnetic material in the direction, (3) a magnetizing process to magnetize the extrusion-molded body in the direction by the axial magnetization, and (4) a laminating process to laminate the magnetized molded body such that the magnetization direction is alternately oriented in opposite directions.

As described above, a multipolar magnet with high magnetic properties can be manufactured with high productivity not by applying multipolar magnetization after molding the bond magnet in the final shape but by having a magnetizing process for magnetizing by the axial magnetization in the same direction as the extrusion direction, between the extrusion molding process and the laminating process.

Hereinafter, each process will be described.

Preparation Process

The preparation process is a process of preparing a bond magnet composition including a magnetic material and a resin. An anisotropic magnetic material can be used as the magnetic material.

The bond magnet composition can be acquired, for example, by mixing a magnetic material and a resin, heating and kneading the acquired mixture and then cutting into pieces having an appropriate size after cooling. The blending ratio of a magnetic material to a resin depends on the type of the resin but the ratio of the magnetic material to the entire bond magnet composition is preferably 45 to 65 vol %. Other than the magnetic material and the resin, antioxidants, lubricants or others can be further mixed. The bond magnet composition may be a lump like a pellet or be in a starch-syrup state at room temperature.

Examples of an anisotropic magnetic material include an Sm—Co based magnetic material, Nd—Fe—B based magnetic material, Sm—Fe—N based magnetic material, and others. The magnetic material is preferably in a powder state. A ferrite based magnetic material has weaker magnetic force than a rare-earth based magnetic material. Since a smaller size of the molded body may cause a shortage of magnetic force, a rare-earth magnetic powder such as an Sm—Co-based powder, Nd—Fe—B-based powder, or Sm—Fe—N-based powder is used in the present embodiment. This is because a magnetization direction of a rare-earth anisotropic magnetic powder is aligned in the same direction very easily by being subjected to a magnetic field applied during the orientation, and consequently exhibits strong magnetic force of the bond magnet.

The average particle diameter of the magnetic powder to be used is preferably smaller than 20%, more preferably smaller than 15%, and still more preferably smaller than 10% of the thickness of the molded body subjected to the extrusion molding described below. When the particle diameter is too large, the extrusion moldability may degrade and the molding of the sheet magnet itself becomes difficult. The Sm—Fe—N based magnetic powder is preferable because its average particle diameter is approximately 3 μm and approximately spherical and thus its extrusion moldability is excellent. In the present description, the value of the average particle diameter is based on the air permeability method or Fisher-SubSieve-Sizers-No. (F.S.S.S.No.).

The above-described magnetic material can be used as one kind alone and also as a mixture of two or more kinds. A surface treatment (for example, an oxidation resistance treatment or a coupling treatment) may be performed, as needed.

Examples of the resin to be used includes, but is not particularly limited to, thermoplastic resins such as polypropylene, polyethylene, polyvinyl chloride, polyester, polyamide, polycarbonate, polyphenylene sulfide, and acrylic resins, thermoplastic elastomers such as ester-based and polyamide-based elastomers, and thermosetting resins such as epoxy resins, phenolic resins, unsaturated polyester resins, urea resins, melamine resins, polyimide resins, allyl resins, and silicone resins. It is preferable to add an antioxidant, a metal deactivator, and a lubricant during the mixing with the magnetic material in order to reduce degradation of the binder due to a thermal history during the kneading or the molding.

Extruding Process

The extruding process is a process of extruding the bond magnet composition in one direction (e.g., direction x) by the extrusion molding while orienting the magnetic material in one direction (e.g., direction x). The extruding process is performed by using an extrusion molding apparatus. An extrusion molding apparatus 200 illustrated in FIG. 1 has a screw section 10 for extruding the bond magnet composition in one direction (e.g., direction x) and a mold section 20 linked with the screw section 10. An orienting magnet 60 is embedded inside the mold section 20.

The screw section 10 conveys the bond magnet composition to the mold section 20 by a screw 30. The bond magnet composition prepared in the preparation process is supplied into a cylinder 50 from a hopper 40. The cylinder 50 is provided outside periphery of the screw 30, and if the need arises, the cylinder 50 may be heated to be in a state suitable for easily conveying the bond magnet composition.

The bond magnet composition conveyed into the mold section 20 is molded into a shape corresponding to the cavity of the mold. The cavity whose dimension in the direction y is longer than the dimension in the direction z can produce a sheet-shaped molded body whose plane direction is the direction x-y (hereinafter, the sheet-shaped molded body formed through the extrusion process is also called "sheet magnet 300"). As FIG. 1 illustrates a schematic enlarged perspective view of part A, the magnetic material is oriented in the in-plane direction (e.g., direction x) of the sheet magnet 300.

The orienting magnet 60 is built in the mold section 20. When the molten bond magnet composition is cooled into a solid, the magnetic powder is orientated at the same time. The orientation method may be an electromagnet method or may be a permanent magnet method. That is, the orienting magnet 60 may be an electromagnet or may be a permanent magnet. The magnetic material used for the permanent magnet is preferably a material whose residual magnetic flux density Br is 1 T or more, and for example, an Nd—Fe—B sintered magnet can be used.

According to the example illustrated in FIG. 1, since permanent magnets, as the orienting magnet 60, are positioned such that the same poles of the magnets face each other from the upper and lower sides of the cavity, the magnetic fields from the upper and lower sides repel each other, and therefore, an orientation magnetic field of a component parallel with the in-plane direction of the cavitation (direction x) can be acquired. The direction of easily magnetized axis of the magnetic powder in the bond magnet composition molded in a sheet shape can be arranged in the extrusion direction (direction x) of the sheet in-plane direction by the orientation magnetic field.

Figure 2:
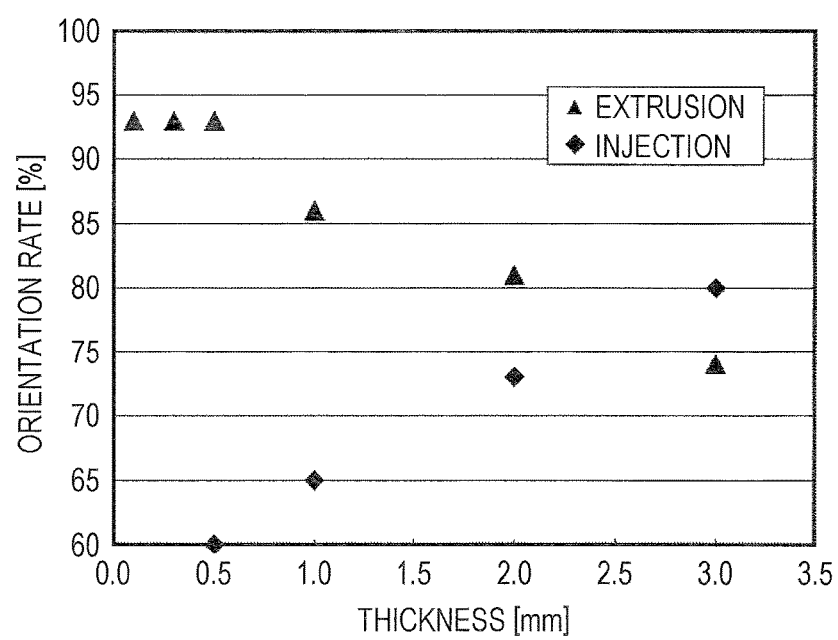
FIG. 2 is a schematic graph illustrating the orientation rate of a sheet magnet subjected to the extrusion molding and the injection molding.

Here, the relationship between the orientation rate and the thickness (direction z) of the sheet-shaped molded body subjected to the extrusion molding according to the present embodiment is described. FIG. 2 is a schematic graph illustrating the difference of the orientation rate in each thickness between the extrusion molding and the injection molding. In the graph, the black triangle (▲) denotes the extrusion molding and the black square (◆) denotes the injection molding. The used bond magnet composition is pellets obtained by weighing out 60 vol % of an anisotropic Sm—Fe—N-based magnetic powder of average particle diameter 2.8 μm subjected to a surface treatment with ethyl silicate and an amino-based coupling agent and 40 vol % of nylon 12, and by kneading these materials with a biaxial kneading machine at 220° C. after a sufficient mixing with a mixer. The intensities of all the orientation magnetic fields are set to be 3.5 kOe.

As illustrated in FIG. 2, the orientation rate reduces as the molded body reduces its thickness in the injection molding, and it is found that the rate drops to 65% in a region where the thickness is 1 mm or less. It is considered that because the solidification of the bond magnet composition rapidly proceeds during the injection molding, the magnetic powder cannot be oriented sufficiently.

On the other hand, in the extrusion molding according to the present embodiment, the orientation rate increases as the thickness goes toward the thin sheet-thickness region. In particular, in the region of 1 mm or less, an orientation rate of 85% which is higher than that of the injection molding by 20% is exhibited.

Figure 3:
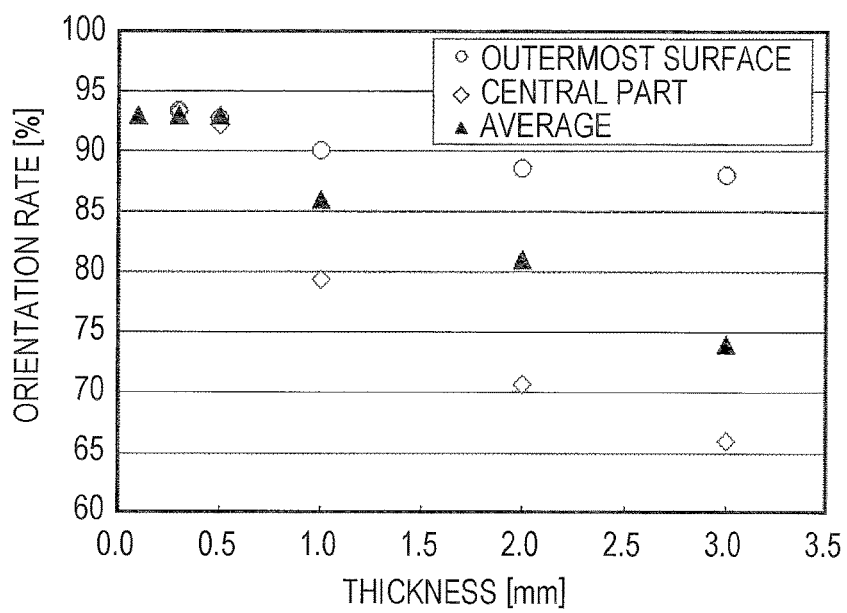
FIG. 3 is a schematic graph illustrating orientation distribution of the sheet magnet in the thickness direction.

Further, in order to confirm the detailed orientation state of the molded body related to the extrusion molding, a sheet magnet is molded by use of a similar material to that in the case in FIG. 2 and the result of investigation of the orientation distribution in the thickness direction of the sheet-shaped molded body is illustrated in FIG. 3. The orientation rate of the outermost surface of the sheet is denoted by a white circle (◯), that of the central part is denoted by a white square (◇) and the average value of the orientation rate between the outermost surface and the central part is denoted by a black triangle (▲). When the orientation rates of the sheet outermost surface and the central part in the thickness direction are compared with each other in the region of 1.0 mm to 3.0 mm, a difference is found between the outermost surface and the central part. Specifically, it is understood that the orientation rate at the outermost surface is approximately 90%, in contrast, whereas the orientation rate at the central part is in a range between approximately 65% and approximately 80%, and the orientation rate at the central part is apparently lower than that at the outermost surface.

In the region where the thickness is 0.5 mm or less, it is found that almost no difference of the orientation rate between the outermost surface and the central part exists. It is considered that an area of the outermost surface having a high orientation rate is dominant in the region where the thickness is 0.5 mm or less. Even in the extrusion molding similarly to the injection molding, it is considered that the flowability of the bond magnet composition reduces near the wall but a high orientation rate is achieved because a certain shearing occurs near the cavity wall continuously and compulsorily at the time of discharge of the bond magnet composition in the extrusion molding, and a magnetic powder becomes capable of moving around freely near the wall even in the thin sheet-thickness region where originally the achievement of orientation is difficult.

As described above, a molded body with a high orientation rate can be obtained by molding a sheet-shaped molded body through the extrusion molding. Further, it is possible to obtain a molded body orientated in one direction, which facilitates alignment of the magnetization direction with the orientation direction in the magnetization conducted in the next magnetizing process, and the properties of the anisotropic magnetic powder can be sufficiently brought out.

Magnetizing Process

The magnetizing process is a process of applying the axial magnetization to the molded body subjected to the extrusion molding in one direction (direction x). As described above, since the orientation of the magnetic material in the sheet-shaped molded body is the in-plane direction (direction x), simple magnetization can be applied in the travelling direction in the extrusion molding (direction x). Hence, an air-core coil with a strong magnetizing magnetic field can be used as a magnetizer 70 illustrated in FIG. 1. The use of air-core coil facilitates the securement of the magnetizing magnetic field with an intensity of 40 kOe or higher and can achieve a magnetization rate of 95% or higher even for a rare-earth magnet having a high coercive force.

In the present embodiment, in other words, magnetization can be performed by using simple axial magnetization, not by using a multipolar magnetizing yoke made in combination with a soft magnetic material and a coil, or the like to apply multipolar magnetization after the final shape of the bond magnet is formed. Due to this, a magnetization defect caused from the limitation of magnetizing magnetic field that occurs because of multipolar magnetization can be avoided.

Laminating Process

The laminating process is a process of laminating magnetized molded body such that the magnetization direction is alternately oriented in opposite directions. Specifically, as illustrated in FIG. 1, the molded body is folded such that the front surfaces and the back surfaces of the sheet are respectively brought into contact with each other and the magnetization directions alternate between opposite directions. At this time, the folding line extends in the direction y. In this manner, folding a long sheet-shaped molded body without cutting can more enhance the productivity compared with a manufacturing method of assembling separated tiny-pieced magnets.

An adhesive may be used or may not be used to a space between the molded body, namely lamination surfaces. When an adhesive is used, since the distance between the neighboring magnetic poles increases by the thickness of the adhesive, the thicknesses of the molded body and the adhesive are determined in consideration of the magnetic pole pitch of the bond magnet that is finally desirable. When the thickness of the adhesive is zero, namely, when no adhesive is used, the thickness of the sheet-shaped molded body becomes the distance between the laminated magnetic N and S poles (magnetic pole pitch of the multipolar magnet).

In the laminating process, a long sheet may be folded to be laminated as described above in consideration of the productivity, or separated sheets cut in a specific length may be stacked alternately for making the lamination. In the case where sheets previously cut are used for the lamination, the cutting process described later can be omitted.

Cutting Process

The cutting process is a process of acquiring a multipolar bond magnet having N-poles and S-poles disposed alternately on its end surface after the laminated molded body is cut out perpendicularly to the lamination direction. A multipolar bond magnet 100 can be obtained after the folded sheet magnet is cut out into the part enclosed by the lines in FIG. 1. Deciding predetermined the cutout length in the lamination direction (e.g., direction x in FIG. 1) results in the determination of the total number of poles of the obtained multipolar magnet.

Bond Magnet 100

Figure 4:
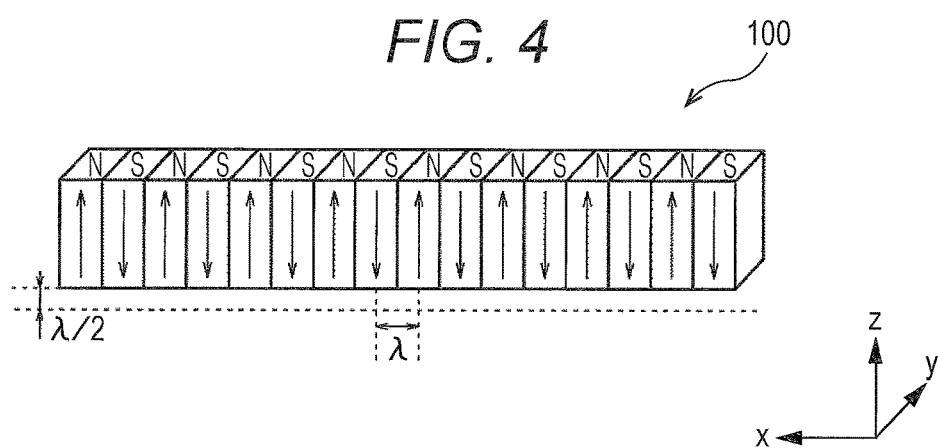
FIG. 4 is a schematic perspective view illustrating a bond magnet according to an embodiment.

FIG. 4 illustrates a schematic perspective view of the bond magnet 100 formed in the above-described manner. The bond magnet 100 is made by laminating alternately the N-poles and S-poles of a plurality of magnet pieces subjected to axial magnetization. Since the distance λ between the laminated N-pole and S-pole is 0.1 mm to 1.0 mm (inclusive) and an anisotropic Sm—Fe—N-based magnetic material is used as the magnetic material, a multipolar magnet with high magnetic properties and a small magnetic pole pitch can be acquired.

Here, the orientation rate of the magnetic material of each magnet piece is preferably 85% or more. The magnetization rate of each magnet piece is preferably 95% or more. The lamination of such magnet pieces can achieve an extremely high surface magnetic flux density despite a multipolar magnet with a small pitch of 0.1 mm to 1.0 mm (inclusive) between the magnetic poles.

EXAMPLES

Example 1

According to the method illustrated in FIG. 1, the bond magnet illustrated in FIG. 4 is manufactured in the following manner.

First, 60 vol % of an anisotropic Sm—Fe—N-based magnetic powder having an average particle diameter of 2.8 µm subjected to a surface treatment with ethyl silicate and an amino-based coupling agent and 40 vol % of nylon 12 are weighed out, and after mixing these materials sufficiently with a mixer, the mixture is kneaded at 220° C. with a biaxial kneading machine. Pellets each having a length of approximately 3 mm are obtained after cooling. By use of these pellets as a bond magnet composition, a sheet-shaped molded body is acquired by the extrusion molding.

In the extrusion molding process, the material is formed in the mold into a sheet-shaped piece having a width (direction y) of 10 mm and a thickness (direction z) of 0.1 mm and is oriented such that the direction of the easily magnetizable axis of the Sm—Fe—N-based magnetic powder is aligned parallel to the in-plane direction (direction x) by using the orientation magnetic field of the orienting magnet as shown in FIG. 1. The molding temperature is 210° C. and the temperature of the mold is 190° C. The intensity of orientation magnetic field in the in-plane direction is 3.5 kOe.

The oriented sheet magnet is subjected to the axial magnetization successively in the same direction as the orientation direction (direction x) by use of an air-core coil as a magnetizer 70 as illustrated in FIG. 1. Since the axial magnetization is performed intermittently, the magnetization is performed while the magnetized areas are partially overlapped such that unmagnetized parts are prevented from being produced on the continuous sheet magnet. The intensity of the magnetizing magnetic field is 40 kOe. After laminating a magnetized sheet magnet, a multipolar bond magnet having a total length (direction x) of 20 mm, a width (direction y) of 10 mm and a height (direction z) of 5 mm is cut out as shown in FIG. 4. In the present example, since no adhesive is used, the magnetic pole pitch λ on the magnetic pole surface of the obtained bond magnet only depends on the thickness of the sheet magnet and is 0.1 mm.

The orientation rate of sheet magnet of the bond magnet, the magnetization rate of the sheet magnet and the surface magnetic flux density at a position λ/2 away from the bond magnet obtained in Example 1 are shown in Table 1.

Examples 2 to 4

Multipolar bond magnets are acquired similarly to Example 1 except that the thicknesses of the sheet magnets are 0.3 mm, 0.5 mm and 1.0 mm respectively. The orientation rate of sheet magnet of the bond magnet, the magnetization rate of the sheet magnet and the surface magnetic flux density at a position λ/2 away from the bond magnet obtained in each example are shown in Table 1.

Example 5

For a bond magnet composition, 60 vol % of an anisotropic Nd—Fe—B-based magnetic powder having an average particle diameter of 100 µm subjected to a surface treatment with methyl silicate and an amino-based coupling agent and 40 vol % of nylon 12 are weighed out, and after mixing these materials sufficiently with a mixer, the mixture is kneaded at 220° C. with a biaxial kneading machine. Pellets each having a length of approximately 3 mm are obtained after cooling. By use of these pellets as a bond magnet composition, a multipolar bond magnet is obtained similarly to Example 1 except that the thickness of the sheet magnet is 1.0 mm. The orientation rate of sheet magnet of the bond magnet, the magnetization rate of the sheet magnet and the surface magnetic flux density at a position λ/2 away from the bond magnet are shown in Table 1.

Comparative Example 1

Although acquisition of a multipolar bond magnet was attempted similarly to Example 5 except that the thickness of the sheet magnet was 0.5 mm, any molded body could not be discharged from the end of the mold during the extrusion molding and the sheet magnet could not be molded.

Comparative Example 2

After 65 vol % of an anisotropic ferrite magnetic powder and 35 vol % of nylon 12 are weighed out and mixed sufficiently with a mixer, the mixture is kneaded at 220° C. with a biaxial kneading machine. Pellets each having a length of approximately 3 mm are acquired after cooling. Next, a molded body having a total length (direction x) of 20 mm, a width (direction y) of 10 mm and a height (direction z) of 5 mm is acquired with the injection molding machine while being oriented sufficiently in the axial direction. Then, multipolar magnetization is applied to the surface having a size of 20 mm×10 mm at 0.5 mm intervals. The intensity of the magnetizing magnetic field is 15 kOe. The surface magnetic flux density of the obtained bond magnet is shown in Table 1. Since the piece is not formed of a lamination structure but formed of an integrally molded body, a sheet magnet is not formed; however the magnetic pole pitch is shown in parentheses as a reference value. Similarly, instead of the orientation rate of the sheet magnet, the orientation rate of the integrally molded body is shown in parentheses as a reference value.

Comparative Example 3

A commercially available isotropic compressed magnet having a total length (direction x) of 20 mm, a width (direction y) of 10 mm and a height (direction z) of 5 mm is prepared and multipolar magnetization is applied to the surface having a size of 20 mm×10 mm at 1.2 mm intervals. The intensity of the magnetizing magnetic field is 15 kOe. The surface magnetic flux density of the obtained bond magnet is shown in Table 1. Since the piece is not formed of a lamination structure but formed of an integrally molded body, a sheet magnet is not formed; however the magnetic pole pitch is shown in parentheses as a reference value.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Magnetic powder | SmFeN | SmFeN | SmFeN | SmFeN | NdFeB | NdFeB | Ferrite | Isotropic NdFeB |
| Molding method | Extrusion | Extrusion | Extrusion | Extrusion | Extrusion | Extrusion | Injection | Compression |
| Thickness of sheet magnet (mm) | 0.1 | 0.3 | 0.5 | 1.0 | 1.0 | 0.5 | (0.5) | (1.2) |
| Orientation rate of sheet magnet (%) | 93 | 93 | 93 | 86 | 78 | Unmoldable | (98) | — |
| Magnetization rate of sheet magnet (%) | 98 | 99 | 98 | 99 | 97 | Unmoldable | — | — |
| Magnetic flux density of laminated bond magnet (G) at a position λ/2 (mm) away | 150 | 700 | 1300 | 1850 | 1530 | Unmoldable | 100 | 500 |

Figure 5:
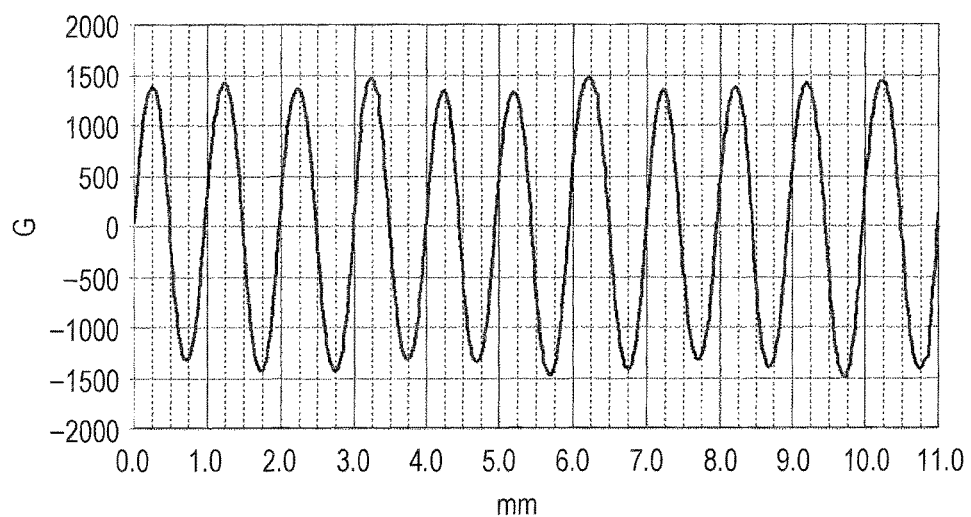
FIG. 5 is a schematic graph illustrating a surface magnetic flux of the bond magnet of Example 3.

As is clear from Table 1, by the manufacturing of a sheet magnet through the extrusion molding by use of an anisotropic Sm—Fe—N-based magnetic powder having an average particle diameter of 2.8 μm, a sheet magnet having a high orientation rate in the thin sheet-thickness region of 1.0 mm or less can be acquired. By laminating this sheet magnet to form a multipolar bond magnet, a multipolar magnet having both of a high orientation rate and a high magnetization rate in a region of a magnetic pole pitch of 1 mm or less can be acquired, which was conventionally difficult for anisotropic rare-earth magnets. FIG. 5 is a schematic diagram illustrating the surface magnetic flux waveform of the bond magnet in Example 3. The magnetic flux density at a position λ/2 away from the bond magnet is 1300 G and higher magnetic flux density is obtained compared with that of ferrite having the same magnetic pole pitch.

Comparative Example 2

Figure 6:
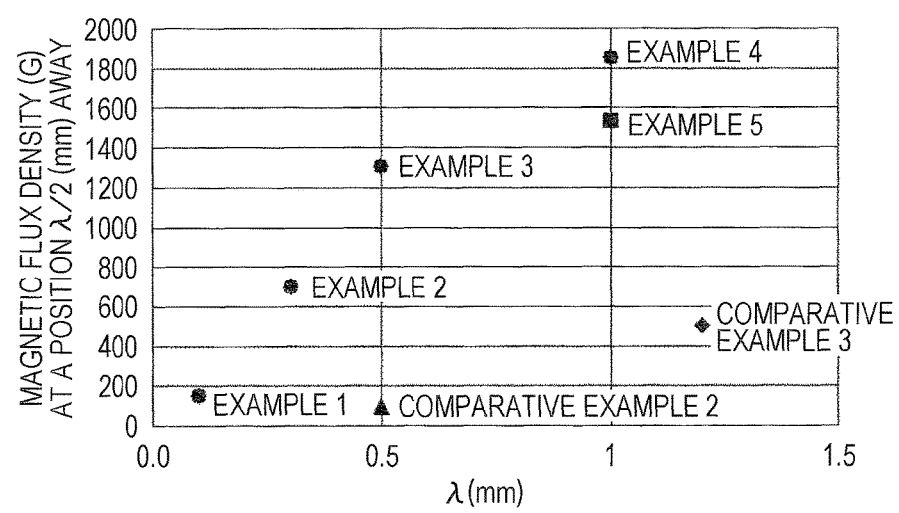
FIG. 6 is a schematic diagram illustrating magnetic flux densities of the bond magnets of examples and comparative examples.

FIG. 6 illustrates the relationship between the magnetic flux density at a position λ/2 from the bond magnet and the magnetic pole pitch λ in the bond magnets in Examples 1-5 and Comparative Examples 2 and 3. It is understood that the magnetic flux densities of the bond magnets acquired in the examples are much higher than those at the same magnetic pole pitch of Comparative Examples 2 and 3 in which molded bodies having final shapes are subjected to multipolar magnetization and thus the property is good. Further, as shown in Example 1 and Comparative Example 2, the magnetic pole pitch can be reduced even to ⅕ or less while maintaining an equivalent magnetic flux density.

When an approximation curve obtained by connecting the plotted points of Examples 1 to 5 in FIG. 6 is drawn to find a range of preferable magnetic flux density, the following expression is satisfied.

$$B(\text{gauss}) > 1520\lambda - 20 \quad (1)$$

(In the expression, B denotes a surface magnetic flux density B (gauss) at a position λ/2 away from the bond magnet.)

The method for manufacturing a bond magnet according to the present embodiment has a preparation process a bond magnet composition including a magnetic material and a resin, an extruding process the bond magnet composition in one direction by the extrusion molding while orienting the magnetic material in the direction, a magnetizing process to magnetize the molded body subjected to the extrusion molding in the direction by the axial magnetization, and a laminating process to laminate the molded body magnetized in the magnetizing process so as to be oriented the magnetization direction alternately in opposite directions.

Further, a bond magnet according to another embodiment is a bond magnet which includes an anisotropic Sm—Fe—N-based magnetic material and a resin and in which N-poles and S-poles of a plurality of magnet pieces magnetized by the axial magnetization are laminated alternately and the distance between the N-pole and the S-pole is 0.1mm to 1.0 mm (inclusive).

According to an embodiment of the present invention, a method capable of manufacturing a multipolar magnet having strong magnetic properties with high productivity can be provided. According to another embodiment, a multipolar magnet that is an anisotropic bond magnet, has strong magnetic properties, and a small magnetic pole pitch can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a bond magnet, the method comprising:
    providing a bond magnet composition including a magnetic material and a resin;
    extruding the bond magnet composition in one direction to produce a molded body while orienting the magnetic material in the one direction;
    magnetizing the molded body in the one direction using an axial magnetization to produce a magnetized molded body; and
    laminating the magnetized molded body to produce a laminated molded body including first magnetized molded layers and second magnetized molded layers, the first magnetized molded layers and the second magnetized molded layers being alternately laminated, and a first magnetization direction of each of the first magnetized molded layers being opposite to a second magnetization direction of each of the second magnetized molded layers.

2. The method according to claim 1, wherein the molded body formed by extruding has a thickness of 1 mm or less.

3. The method according to claim 1, wherein an average particle diameter of the magnetic material is 10% or less of a thickness of the molded body.

4. The method according to claim 1, wherein the magnetic material comprises an Sm—Fe—N based magnetic material.

5. The method according to claim 1, further comprising:
    cutting the laminated molded body along a plane including a laminating direction of the laminated molded body to produce the bond magnet including N-poles and S-poles which are arranged alternately on a cutting face of the laminated molded body.

6. A bond magnet comprising:
a plurality of magnet pieces magnetized by axial magnetization and laminated such that N-poles and S-poles of the plurality of magnet pieces are alternately arranged, the plurality of magnet pieces comprising:
an anisotropic Sm—Fe—N-based magnetic material; and
a resin; and
a distance $\lambda$ between an N-pole among the N-poles and an S-pole adjacent to the N-pole among the S-poles is equal to or more than 0.1 mm and equal to or less than 1.0 mm.

7. The bond magnet according to claim 6, wherein an orientation rate of the magnetic material of the plurality of magnet pieces is 85% or more.

8. The bond magnet according to claim 6, wherein a magnetization rate of the plurality of magnet pieces is 95% or more.

9. The bond magnet according to claim 6, wherein a surface magnetic flux density B (gauss) at a position away from the bond magnet by $\lambda/2$ satisfies a following expression (1):

$$B(\text{gauss}) > 1520\lambda - 20 \qquad (1)$$

10. A method for manufacturing a bond magnet, the method comprising:
providing a bond magnet composition including a magnetic material and a resin;
extruding the bond magnet composition in one direction to produce a molded body;
orienting the magnetic material in the one direction;
magnetizing the molded body in the one direction using an axial magnetization to produce a magnetized molded body; and
laminating the magnetized molded body to produce a laminated molded body including a first magnetized molded layer and a second magnetized molded layer adjacent to the first magnetized molded layer such that a first magnetization direction of the first magnetized molded layer is opposite to a second magnetization direction of the second magnetized molded layer.

11. The method according to claim 10, wherein extruding the bond magnet composition in the one direction while orienting the magnetic material in the one direction.

* * * * *